Feb. 14, 1956 C. G. DE LAVAL, JR 2,734,818
PROCESS OF MAKING STAINLESS STEEL CASTINGS
IN A REVERBERATORY FURNACE
Filed Oct. 24, 1952
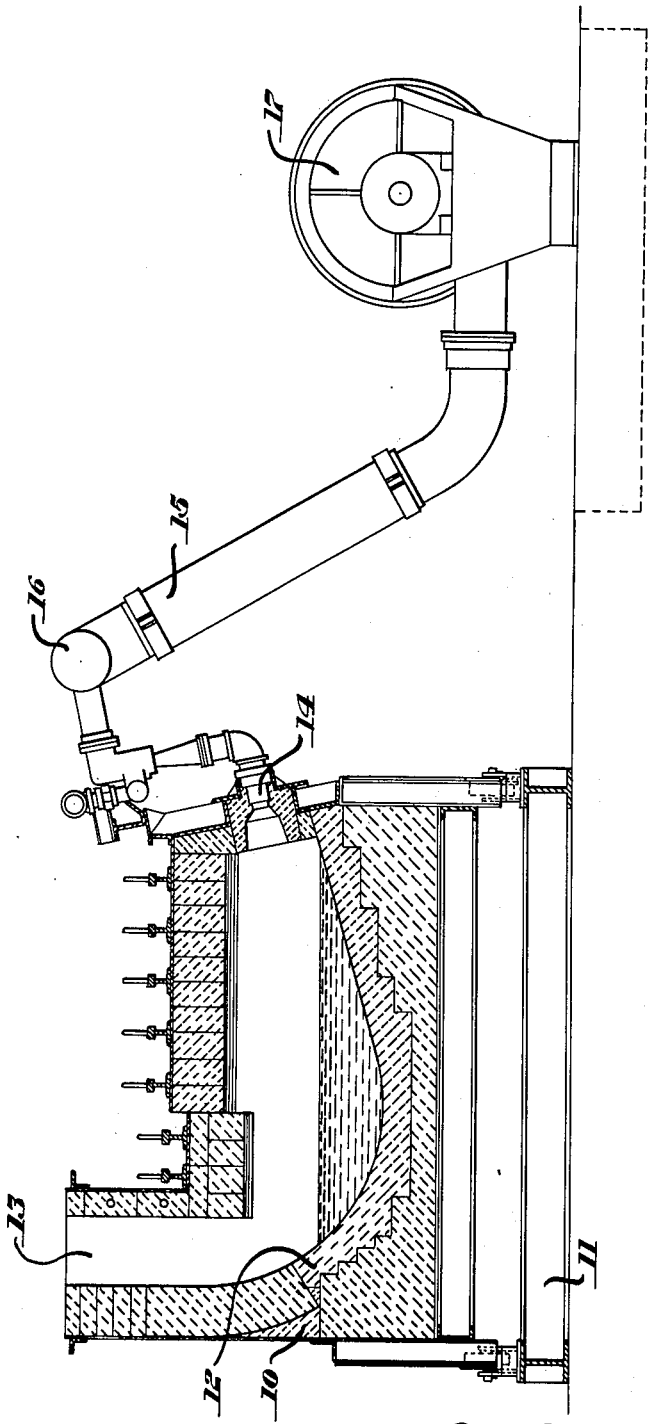
INVENTOR
CARL GEORGE DELAVAL JR.

2,734,818
Patented Feb. 14, 1956

2,734,818

PROCESS OF MAKING STAINLESS STEEL CASTINGS IN A REVERBERATORY FURNACE

Carl George de Laval, Jr., Mount Lebanon Township, Allegheny County, Pa.

Application October 24, 1952, Serial No. 316,594

2 Claims. (Cl. 75—43)

This invention relates to reverberatory furnace practice and particularly to a method of operating direct fired reverberatory furnaces for the manufacture of stainless steel castings. Direct fired reverberatory furnaces have been used to a considerable extent in the nonferrous metal casting industry. They have, however, not been entirely satisfactory in iron foundry practice although they have many characteristics which make them desirable there. Direct fired reverberatory furnaces heat rapidly, attain relatively high temperatures and are easily charged and cast from. However, it has been heretofore impossible to take complete advantage of these characteristics even for the use of common iron castings, and the use of such furnaces for the melting and refining of stainless steel has been deemed virtually impossible. Stainless steel castings have accordingly been universally made by means of electric furnace practices.

I have discovered a method of operating a direct fired reverberatory furnace which permits their use for the melting and refining of stainless steel. The practice of my invention is probably best explained by the following example and the accompanying drawing.

In the drawing I have illustrated a typical direct fired reverberatory furnace having a framework 10 tiltably mounted on a base 11 for ease of pouring. Within the furnace framework is constructed a furnace hearth 12 and sidewalls. At one end of the furnace is provided a charging opening 13 and at the opposite end of the furnace is provided a series of burners 14 directed towards the center of the hearth. Combustion air is carried to the burners 14 through a flexible pipe 15 and manifold 16 from a combustion air blower 17. The fuel (gas or oil) is introduced into the burners 14 by means of a fuel line and regulator, not shown.

A furnace such as illustrated in the drawing was lined with basic magnesite brick. The furnace was then heated to a temperature above 3000° F. and maintained at that temperature until the refractories of the sidewalls and hearth of the furnace had been saturated with heat. Two thousand pounds of mixed chromium-nickel scrap was charged into the charging opening 13 along with ferrosilicon, calcium carbide, limestone, iron ore and fluorspar. The furnace temperature at the time of charging was 3020° F. by means of an optical pyrometer. After the charge melted down additional fluorspar and sodium carbonate was added to maintain the resulting slag in the molten condition. Any one of the group fluorspar and sodium carbonate may be added for this purpose or they may be added in any suitable combination. Additional calcium carbide was added after the melt down to reduce substantially all of the chromium oxide formed in the melt down and which had not been reduced by the action of the ferrosilicon, and calcium carbide in the original charge. Iron ore was added to the bath to reduce the carbon to the desired level and to increase slag fluidity and limestone was added to adjust the V-ratio to approximately 2 to 1. Mill scale or judicious use of the oxygen lance may be substituted for the iron ore to reduce the carbon. The oxygen lance has the further advantage of aiding in maintaining a high bath temperature. The temperature of the furnace was maintained at substantially 3000° F. throughout the entire melt down and adjusting period and was tapped with a metal tapping temperature of 2970° F. (optical pyrometer). The temperature of the furnace at the time of tapping was 3030° F. by the optical pyrometer. Samples of the steel being poured from the furnace were taken from the early part of the tap and at a late part of the tap. The analysis of these samples was as follows:

|  | Early Part, percent | Late Part, percent |
|---|---|---|
| Carbon | .38 | .37 |
| Chromium | 20.70 | 20.30 |
| Nickel | 15.90 | 16.04 |
| Silicon | .76 | .76 |
| Manganese | .54 | .62 |
| Molybdenum | .42 | .44 |

It is apparent from the final analysis of the material that the chromium and nickel are retained in the metal without substantial oxidation. I have found that in order to accomplish this end the furnace must be lined with a basic lining, preferably magnesite brick. The refractory temperature of the furnace must be above about 3000° F. throughout the furnace floor and side walls prior to charging the furnace. This temperature must be maintained in the furnace during charging and melting. One or more of the group fluorspar and sodium carbonate must be added to the bath after the melt down to maintain a workable fusion point of the slag. Reducing agents such as ferrosilicon, calcium carbide and silicon carbide must be added to the bath in sufficient quantity to permit substantially complete reduction of chromium oxide in the slag or to prevent its formation and sufficient lime or limestone must be added to the slag to maintain the proper V-ratio or basicity of about 2 to 1. In addition I have found that in order to melt stainless steel in a direct fired reverberatory furnace it is necessary to substantially completely remove all of the slag from each heat so as to start each heat with a substantially clean furnace. If any of these requirements are not followed the resulting steel will either have lost its chromium content or will have produced a slag which is untappable and will require considerable loss of time and material to remove it from the interior of the furnace.

I have found that by observing this practice I am able to consistently melt and tap stainless steel from a direct fired reverberatory furnace, a practice which was heretofore deemed impossible. I have thus made it possible to use a small inexpensive furnace to duplicate results which could heretofore only be obtained in expensive electric furnace installations.

While I have described a preferred practice of my invention it will be understood that it may be otherwise embodied within the scope of the following claims.

I claim:

1. The method of operating a direct fired basic lined reverberatory furnace for the manufacture of stainless steel castings in the presence of an oxidizing flame comprising the steps of heating the furnace to a temperature of at least about 3000° F., and thereafter successively repeating the steps of simultaneously charging the furnace throat with high chromium and nickel containing scrap, sufficient material from the group consisting of ferrosilicon and calcium carbide to reduce all chromium oxide as formed, sufficient material from the group consisting of fluorspar and sodium carbonate to react with all silicon oxides as formed and maintain a fluid slag, and sufficient limestone to maintain a V-ratio of about 2 to 1, maintaining the temperature of the furnace at least about 3000° F., melting the charge in the throat of the furnace, permitting the melted charge to flow into the hearth of the furnace, tapping the molten metal at a temperature of at least about 3000° F. and thereafter removing substantially all of the slag resulting from the operation prior to repeating the cycle.

2. The method of operating a direct fired basic lined reverberatory furnace for the manufacture of stainless steel castings in the presence of an oxidizing flame comprising the steps of heating the furnace to a temperature of at least about 3000° F., and thereafter successively repeating the steps of simultaneously charging the furnace throat with high chromium and nickel containing scrap, sufficient ferrosilicon to reduce all chromium oxide as formed, sufficient fluorspar to react with all silicon oxides as formed and maintain a fluid slag and sufficient limestone to maintain a V-ratio of about 2 to 1, maintaining the temperature of the furnace at least about 3000° F., melting the charge in the throat of the furnace, permitting the melted charge to flow into the hearth of the furnace, tapping the molten metal at a temperature of at least about 3000° F. and thereafter removing substantially all of the slag resulting from the operation prior to repeating the cycle.

References Cited in the file of this patent

UNITED STATES PATENTS

| | | |
|---|---|---|
| 1,641,326 | Farnsworth | Sept. 6, 1927 |
| 2,049,091 | Stimson | July 28, 1936 |
| 2,218,391 | Bradford et al. | Oct. 15, 1940 |